United States Patent [19]
Kojima

[11] Patent Number: 6,081,275
[45] Date of Patent: Jun. 27, 2000

[54] IMAGE COMPOSITING APPARATUS

[75] Inventor: Kunio Kojima, Funabashi, Japan

[73] Assignee: Sharp Kabushiki Kaisha, Osaka, Japan

[21] Appl. No.: 09/003,328

[22] Filed: Jan. 6, 1998

[30] Foreign Application Priority Data

Jan. 10, 1997 [JP] Japan .................................. 9-002713

[51] Int. Cl.[7] .............................................. G06T 11/00
[52] U.S. Cl. .......................................... 345/427; 345/430
[58] Field of Search .................................. 345/429, 430, 345/431, 425, 427

[56] References Cited

U.S. PATENT DOCUMENTS

| | | | |
|---|---|---|---|
| 4,645,459 | 2/1987 | Graf et al. | 434/43 |
| 5,714,997 | 2/1998 | Anderson | 348/39 |

FOREIGN PATENT DOCUMENTS

| | | |
|---|---|---|
| 6348860 | 12/1994 | Japan . |
| 8161510 | 6/1996 | Japan . |

Primary Examiner—Mark R. Powell
Assistant Examiner—Thu Nguyen

[57] ABSTRACT

The image compositing apparatus includes: a texture image storage device for storing as a texture image the image of a three-dimensional polygon object viewed in the direction of its depth from a predetermined angle of view; a three-dimensional positional inputting device for inputting the movement of the view point from which the three-dimensional polygon object is viewed in the direction of its depth from the predetermined angle of view; and a display image generating device which, in accordance with the movement of the view point obtained from the three-dimensional positional inputting device, generates a display image by modifying the polygon onto which an image viewed in the direction of its depth from the predetermined angle of view is mapped, in such a manner that the perspective of the image viewed in the direction of its depth from the predetermined angle of view will be aligned with the perspective of three-dimensional polygon object viewed in the direction of its depth from the predetermined angle of view.

9 Claims, 6 Drawing Sheets

IMAGE COMPOSITING APPARATUS

BACKGROUND OF THE INVENTION

(1) Field of the Invention

The present invention relates to an image compositing apparatus using texture mapping, in an appliance in which computer graphics are applied.

(2) Description of the Prior Art

Conventionally, in the field of computer graphics, there has been a technique which creates an image enhanced in reality, 3-D feeling and surface texture, when compared to the image created by only polygons, by mapping a variety of patterns, pictures and photographs etc. onto the surfaces of polygon objects.

For example, when a photograph of a brick wall has been mapped onto the surface of a single planar polygon object, it is possible to create a brick wall having a real representation enhanced in surface texture without using a number of brick-like polygon objects.

Use of this technique enables creation of a variety of virtual 3-D spaces and can be applied to simulations, virtual reality, computer games, such as representations of a walk-through in a building, flight simulators, racing games, etc.

In particular, in the field where images need to be formed in real time, such as virtual reality, arcade games, the texture mapping technique which needs fewer calculations for processing of polygons is used very often to enhance the reality of a virtual space.

Japanese Patent Application Laid-Open Hei 6 No. 348,860 has proposed an image compositing apparatus wherein, each image of the polygons of a 3-D object obliquely observed from a typical plurality of angles of view located along the path of movement of the view-point coordinate system, is stored beforehand as texture information, and each of the polygons of the above three-dimensional object is mapped with the texture information which corresponds to the positional relation between the view-point coordinate system and the three-dimensional object, to thereby represent an oblique image of a 3-D object using a lower number of polygons.

Further, Japanese Patent Application Laid-Open Hei 8 No. 161,510 has proposed a texture mapping apparatus, wherein mapping is performed by extracting optical polygon dividing points in accordance with the size of a polygon to be mapped, to thereby produce a natural, realistic, mapping image with fewer calculations.

In using a texture mapping technique, for example, when a space having a certain depth, e.g., two continuous rooms is rendered, the image of the next room to the rear is represented as a texture, and this may be mapped onto the single polygon which is located at the partitioning plane between the two rooms, it is possible to render a space having depth using a lower number of polygons, without needing object representation of the rear room.

However, since in this case, the image of the next room is represented as a texture, viewed from a particular point, the perspective of the images of the front room and rear room will not align with each other when the view-point is moved from that at which the texture image was prepared.

In the image compositing apparatus disclosed in Japanese Patent Application Laid-Open Hei 6 No. 348,860, the movement of the view point of the observer should be predicted beforehand and a number of patterns of images viewed from required angles of view should be prepared in advance, needing a large size of texture memory.

Moreover, the texture mapping apparatus disclosed in Japanese Patent Application Laid-Open Hei 8 No. 161,510 is a type which eliminates distortion and perspective of the texture map within a single polygon to be mapped so as to produce a natural texture image, but not a type which considers the discordance of perspective between the polygon and its surrounding, occurring as the observer moves.

SUMMARY OF THE INVENTION

The present invention has been devised with the above view, and it is an object of the invention to provide an image compositing apparatus which can render a three-dimensional image having a more natural representation of depth using a lower number of polygons by reducing unnatural discordance of the perspective of a mapped texture representing depth when the view point is changed from one place to another.

In order to attain the above object of the invention, the gist of the invention is as follows:

In order to achieve the above object, the present invention is configurated as follows:

In accordance with the first aspect of the invention, an image compositing apparatus for compositing a display image by perceptively projecting a three-dimensional polygon object generated in a virtual reality space, onto a projected plane which belongs in the view-point coordinate system, a texture image storage device for storing as a texture image the image of the three-dimensional polygon object viewed in the direction of its depth from a predetermined angle of view;

a three-dimensional positional inputting device for inputting the movement of the view point from which the three-dimensional polygon object is viewed in the direction of its depth from the predetermined angle of view; and a display image generating device which, in accordance with the movement of the view point obtained from the three-dimensional positional inputting device, generates a display image by modifying the polygon onto which an image viewed in the direction of its depth from the predetermined angle of view is mapped, in such a manner that the perspective of the image viewed in the direction of its depth from the predetermined angle of view will be aligned with the perspective of three-dimensional polygon object viewed in the direction of its depth from the predetermined angle of view.

In accordance with the second aspect of the invention, the image compositing apparatus having the above first feature is characterized in that the three-dimensional positional inputting device is attached to the head of an observer.

By these configurations, it is possible to create an image with a reduced discordance in the perspective occurring when the view point has moved in the three-dimensional space wherein a texture having depth feeling is mapped. Consequently, it becomes possible to create a virtual space having a more natural depth feeling with a lower number of polygons.

DESCRIPTION OF THE PREFERRED EMBODIMENTS

Figure 1:
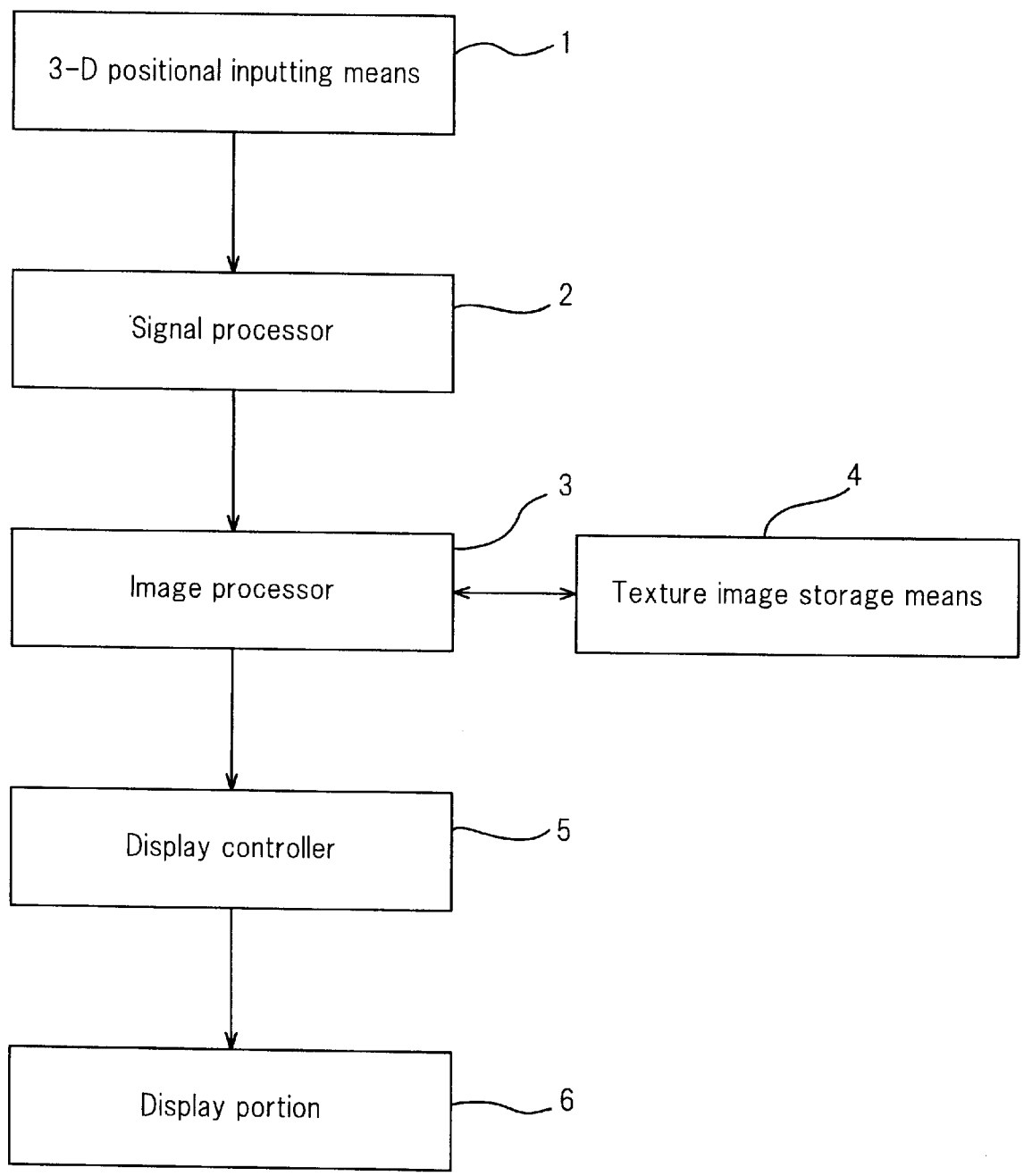
FIG. 1 is a block diagram showing an overall configuration of an embodiment of an image compositing apparatus of the invention.

The embodiment of an image compositing apparatus of the invention will hereinafter be described in detail with reference to FIGS. 1 through 9. The image compositing apparatus of this embodiment comprises: as shown in FIG. 1, a three-dimensional positional detecting device 1 for inputting the viewpoint; a signal controller 2 for converting the signal from input means 1 into a signal suitable for image processing and controlling the signal; an image processor 3 for generating a texture having alignment in perspective, based the signal received from signal controller 2; a texture image storage device 4 which has stored texture images to be used for mapping in image processor 3; and a display controller 5 for controlling the image to be displayed on the display device of a display portion 6 in accordance with the after mentioned calculation in image processor 3. In this case the above three-dimensional positional inputting device 1 is preferably attached to the head of the observer.

Figure 2:
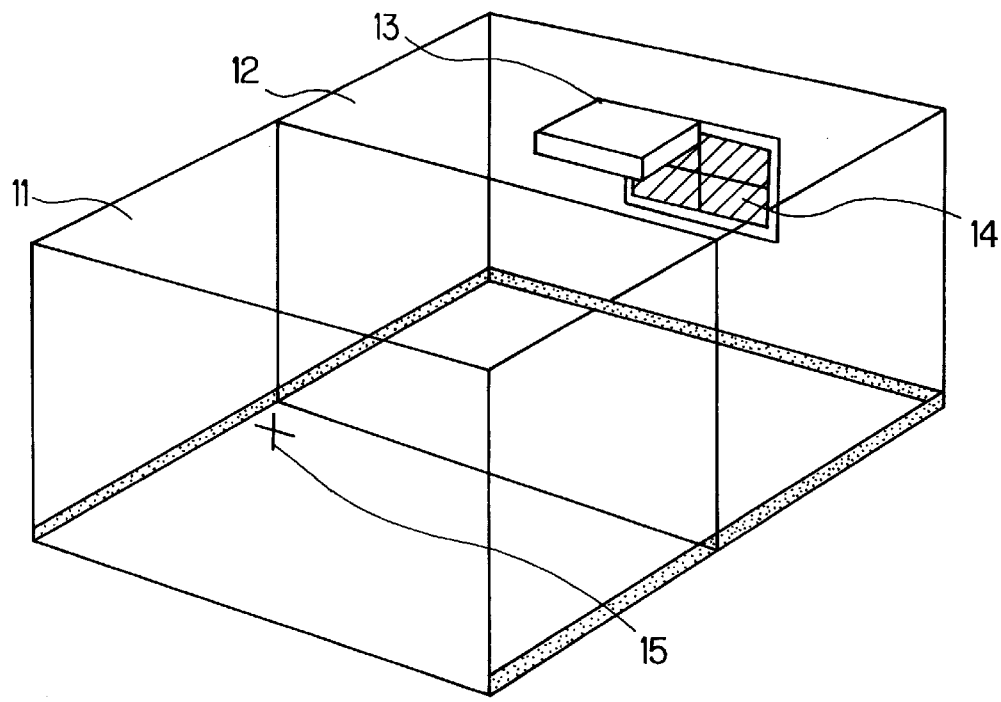
FIG. 2 is a perspective illustration showing a three-dimensional space having depth, consisting of two rooms, front and rear rooms 11 and 12.

Next, the operation of an image compositing apparatus of this embodiment will be explained. FIG. 2 is a perspective illustration of a three-dimensional space having depth consisting of two rooms, namely, front and rear rooms 11 and 12. In FIG. 2, 13 designates an electric light attached to the ceiling of rear room 12 as a three-dimensional object, and 14 designates a window provided in rear room 12 as another three-dimensional object.

Figure 3:
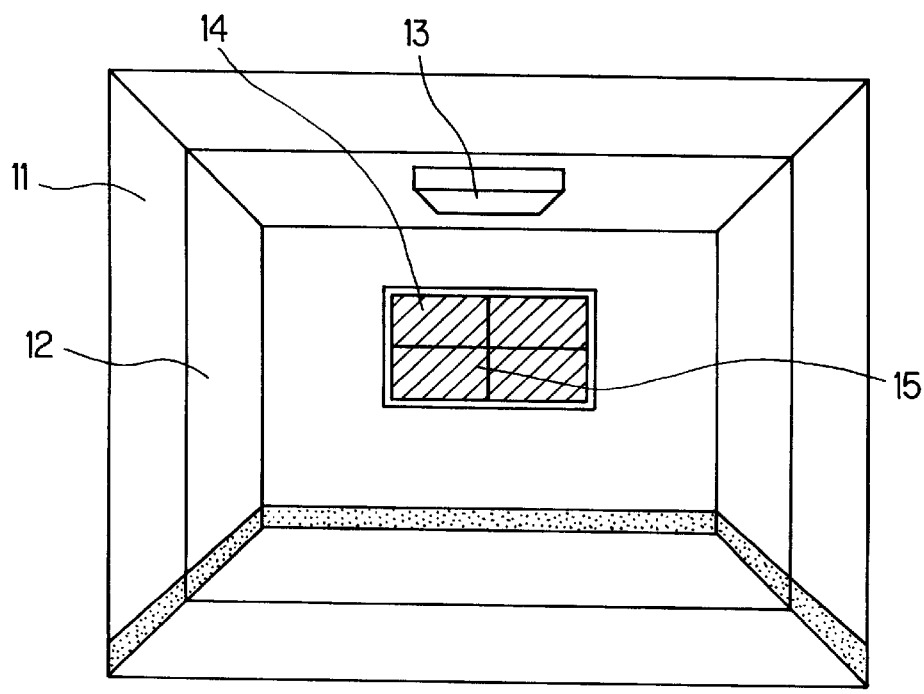
FIG. 3 is an illustrative view showing the three-dimensional space viewed from view point 15 in FIG. 2.

In the typical 3-D computer graphics, depth relationships between objects with respect to the view point are distinguished and the relationship between hidden and viewable objects is calculated so as to display polygon objects existing in the field of view. FIG. 3 shows a three-dimensional space viewed from a view point 15 in FIG. 2.

Figure 4:
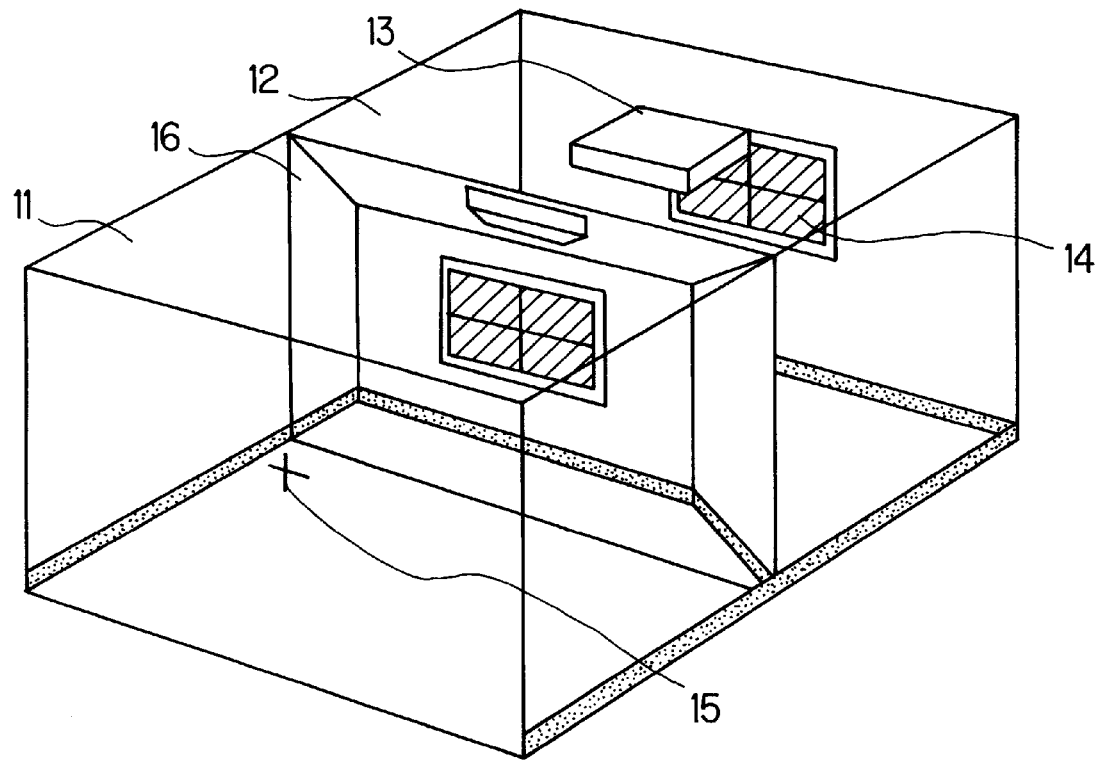
FIG. 4 is a perspective illustration showing a state in which the three-dimensional space viewed from view point 15 in FIG. 2 is projected onto apolygon 16 located at the boundary between front and rear rooms 11 and 12.
Figure 5:
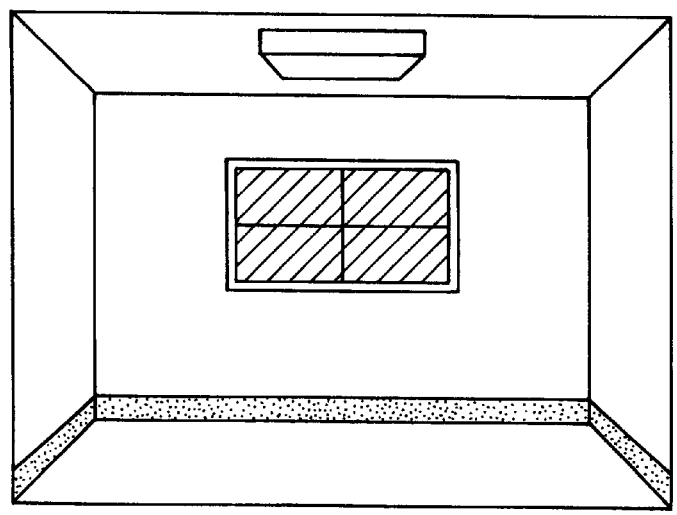
FIG. 5 is an illustrative view showing the image of rear room 12 projected onto polygon 16, used as a two-dimensional texture image.

FIG. 4 is a perspective illustration showing a state in which the three-dimensional space viewed from view point 15 in FIG. 2 is projected onto a polygon 16 provided in the boundary between front and rear rooms 11 and 12. Here, the image of rear room 12 projected on polygon 16 as a two-dimensional texture image is shown in FIG. 5. When the two-dimensional texture image thus formed is texture mapped onto polygon 16, the viewer can recognize the same space as the three-dimensional space from view point 15 shown in FIG. 2.

Figure 6:
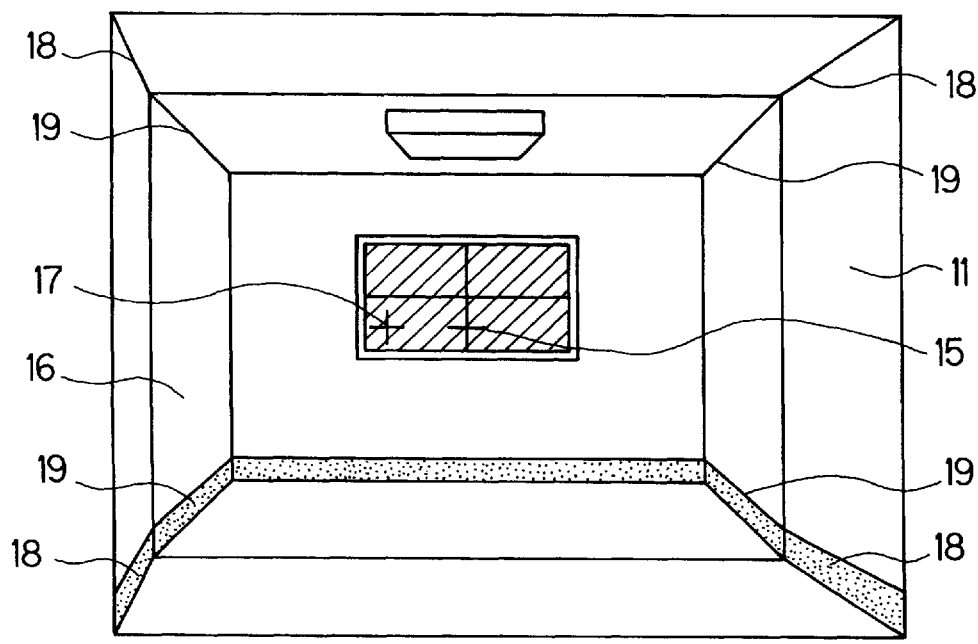
FIG. 6 is an illustrative view showing a three-dimensional space viewed from a view point 17.

When the view point is translated from point 15 to point 17, the perspective of front room 11 changes as shown in FIG. 6 but the perspective of the image of rear room 12 which is texture mapped on polygon 16 cannot change. Therefore, line sections 18 in the four corners of front room 11 along its depth will not continue to be in alignment with line sections 19 of the room of the texture image on polygon 16, thus the resulting view forms a discordant, discontinuous space with respect to the perspective.

Figure 7:
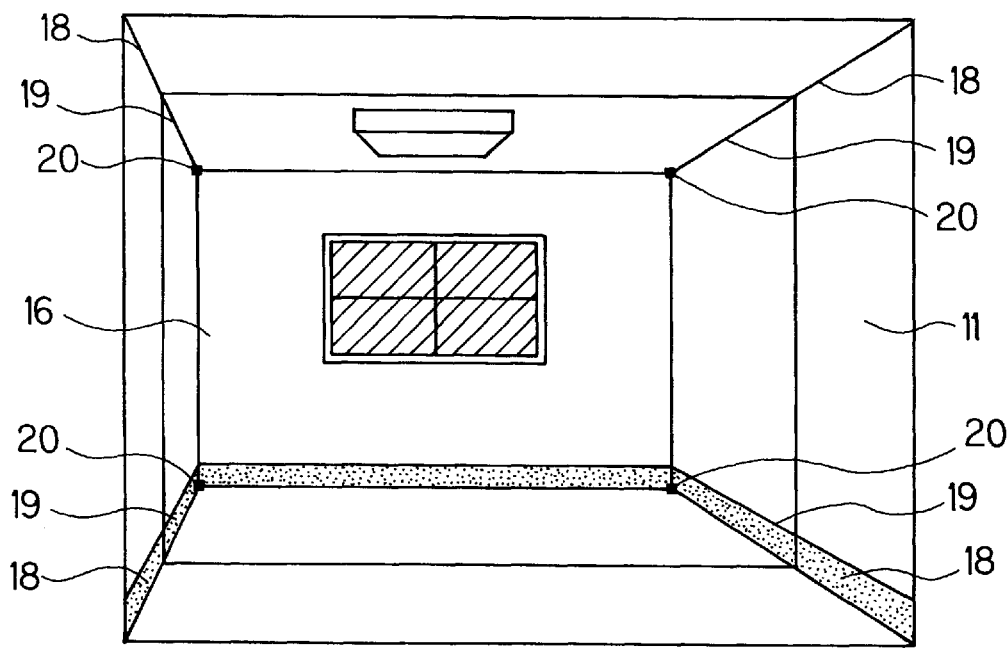
FIG. 7 is an illustrative view showing a three-dimensional space produced by the embodiment of an image forming apparatus of the invention.

For this reason, in the image compositing apparatus of this embodiment, as shown in FIG. 7, the texture image is mapped based on the corresponding points on polygon 16, so that four points 20 are generated at the positions on polygon 16 corresponding to the corner points of the rear room 12 depicted in the texture image on polygon 16.

These points 20 are adaptively moved in accordance with the movement of the view point, and thus each point on the texture image of polygon 16 is moved correspondingly so that the texture image deforms in the correct manner. Thus it becomes possible to maintain the perspective of line sections 19 in alignment with the direction depth of front room 11, imparting a more natural depth feeling.

Figure 8:
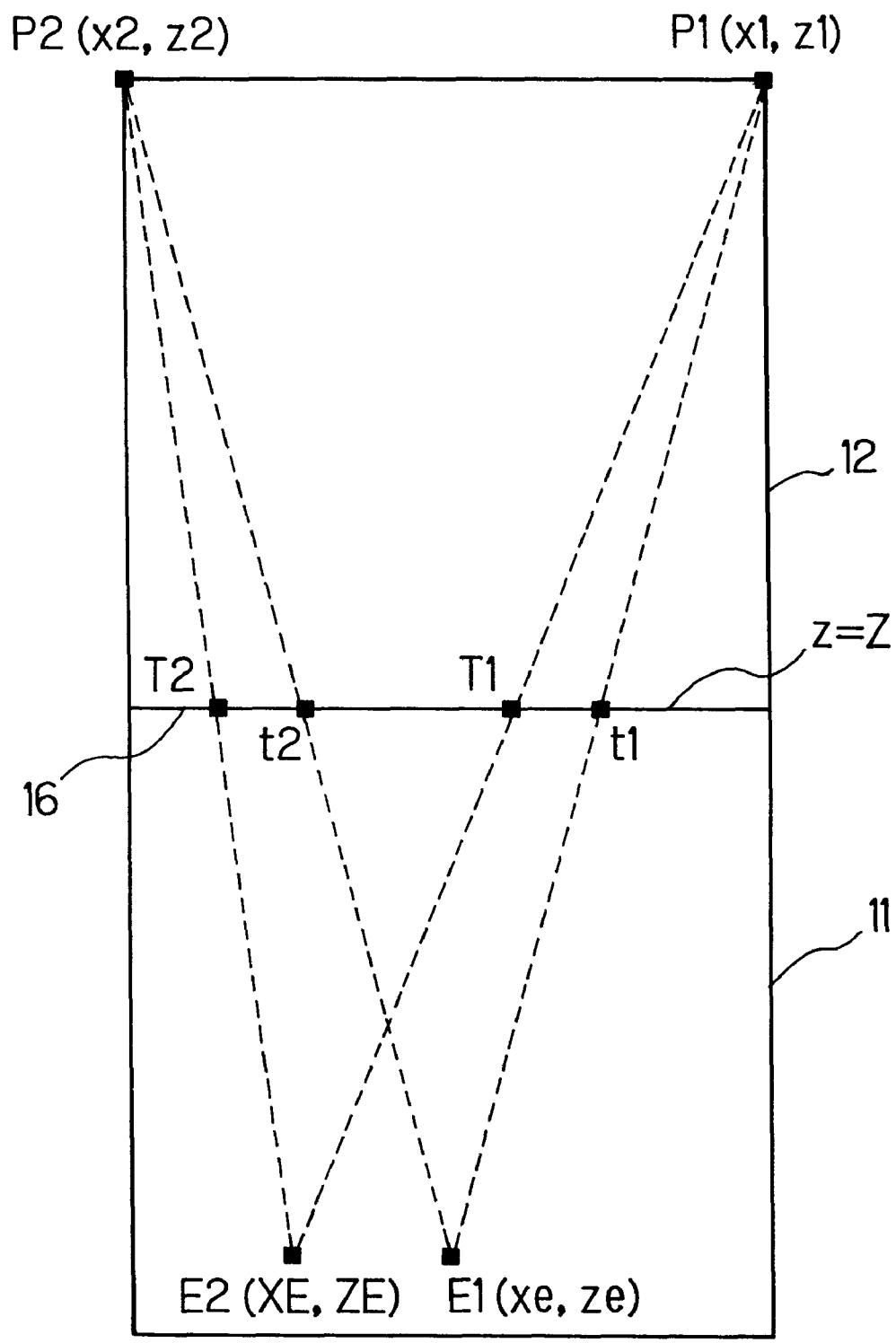
FIG. 8 is an illustrative plan view showing front and rear rooms 11 and 12.

Here, a specific example of adaptive movement of points 20 on polygon 16 with the variation of the perspective in accordance with the movement of the viewer position will be explained with reference to FIGS. 8 and 9. FIG. 8 is an illustrative plan view showing front and rear rooms 11 and 12. In this figure, a viewer sees the rooms from a view point E1(xe,ze). When rear points P1(x1,z1) and P2(x2,z2) in rear room 12 are projected on polygon 16 located on a plane z=Z, as points t1 and t2, the x-coordinates of points t1 and t2 are determined as following formulae:

$$t1(x)=(xe-x1)(z1-Z)/(z1-ze)$$

$$t2(x)=(xe-x2)(z1-Z)/(z1-ze).$$

When the view point is moved from point E1 to point E2, the shifts along x-axis and z-axis are assumed to be a and b, respectively. As a result of the movement of the viewpoint, points t1 and t2 are assumed to move to points T1 and T2. The x-coordinates of T1 and T2 are determined by the following formulae:

$$T1(x)=((xe-a)-x1)(z1-Z)/(z1-(ze-b))$$

$$T2(x)=((xe-a)-x2)(z1-Z)/(z1-(ze-b)).$$

Figure 9:
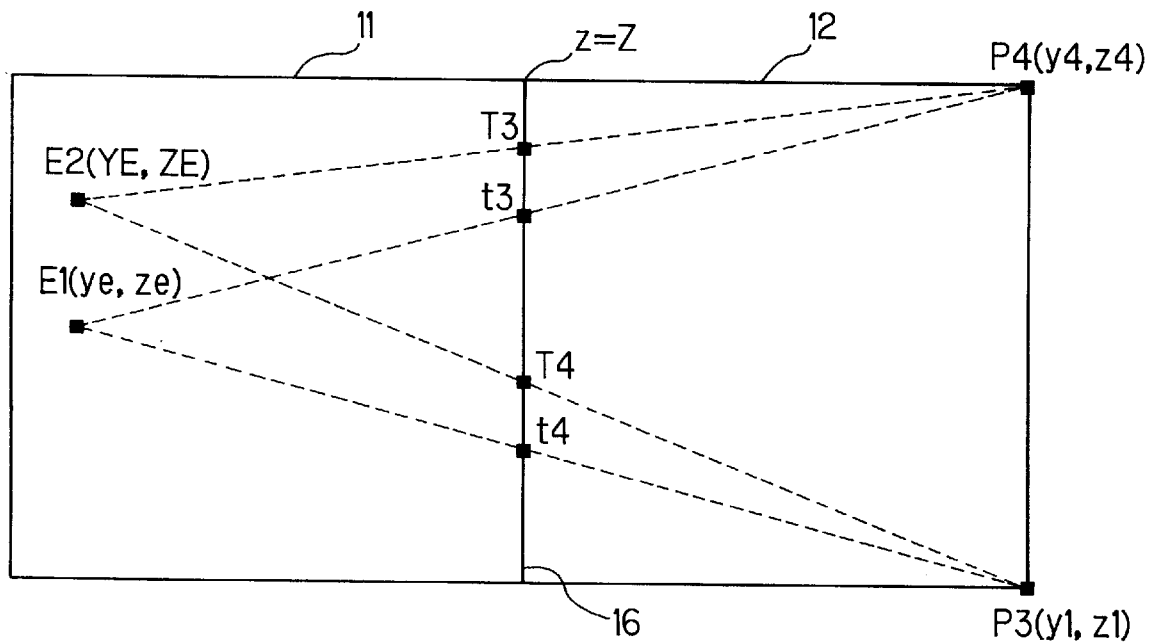
FIG. 9 is an illustrative side view showing front and rear rooms 11 and 12.

FIG. 9 is an illustrative side view showing front and rear rooms 11 and 12. In this figure, a viewer sees the rooms from a view point E1(ye,ze). When backside points P3(y1,z1) and P4(y2,z2) in rear room 12 are projected on polygon 16 located on a plane z=Z, as points t3 and t4, the y-coordinates of points t3 and t4 are determined as following formulae:

$$t3(y)=(ye-y1)(z1-Z)/(z1-ze)$$

$$t4(y)=(ye-y2)(z1-Z)/(z1-ze).$$

When the view point is moved from point E1 to point E2, the shifts along y-axis and z-axis are assumed to be c and d, respectively. As a result of the movement of the viewpoint, points t3 and t4 are assumed to move to points T3 and T4. The y-coordinates of T3 and T4 are determined by the following formulae:

$$T3(y)=((ye-c)-y1)(z1-Z)/(z1-(ze-d))$$

$$T4(y)=((ye-c)-y2)(z1-Z)/(z1-(ze-d)).$$

In this way, by detecting the variations of the view-point coordinate values in accordance with the movement of the view point using the three-dimensional positional inputting device 1 attached to the head of the observer, calculating positional coordinates of each point 20 on polygon 16 in image processor 3 based on the above formulae, and changing the texture image of polygon 16 in real time, it becomes possible to create a space having a more natural depth representation keeping the alignment of the perspective.

Since the image compositing apparatus in accordance with the invention, is thus configured, it is possible to adaptively vary the texture perspective in accordance with the movement of the observer, and it is possible to create a space having a more natural depth representation. In addition, the reduction of a three-dimensional space involving many polygon objects to a two-dimensional image (texture image) and just mapping it onto to a simple polygon makes it possible to reduce the polygon calculating process load.

What is claimed is:

1. An imaging apparatus for composing a display image of a three-dimensional polygon object generated in a virtual reality space, projected onto a plane in a view-point coordinate system, comprising:

a texture image storage device for storing the image of the three-dimensional polygon object viewed in a depth direction from an original view-point, as a texture image;

a three-dimensional positional detecting device for inputting changes in said original angle of view; and a display image generating device which, based on changes in view angle from said original view-point, generates a display image by appropriately dividing a polygon plane onto which a texture image is mapped, and by moving, on said polygon plane, an apex being generated as a result of division, so that the perspective of the image viewed in the depth direction after the chances in view angle are aligned with the perspective of said three-dimensional polygon object previously viewed in the depth direction from said original view-point.

2. The imaging apparatus according to claim 1, wherein the three-dimensional positional detecting device is attached to the head of an observer.

3. An imaging apparatus for composing a display image, comprising:

a three-dimensional positional detector for detecting changes in view angle from an original angle-of-view position to a new angle-of-view position of a three-dimensional polygon object generated in a virtual reality space and viewed in a depth direction; and a display image generating device which generates a display image based on the detected changes in view angle from said original angle-of-view by appropriately dividing a polygon plane onto which a texture image is mapped, and by moving, on said polygon plane, an apex being generated as a result of division, so that the perspective of the image viewed in the depth direction after a change in view angle position is aligned with the perspective of the three-dimensional polygon object previously viewed in the depth direction from the original angle-of-view position, thereby reducing discordance of perspective as angle of view changes.

4. The apparatus of claim 3, said three-dimensional position detector attached to the head of an observer.

5. The apparatus of claim 3, the image of said three-dimensional polygon object generated in a virtual reality space and viewed in a depth direction being stored as a texture image in a memory.

6. The apparatus of claim 3, said alignment between perspectives based on generating points at positions on said three-dimensional polygon object corresponding to points depicted in said texture image mapped on said three-dimensional polygon object.

7. The apparatus of claim 6, said generated points adaptively moved with change in view angle position to deform said texture image so as to maintain perspective aligned in depth.

8. A method of composing a display image, comprising:

detecting changes in view angle from an original angle-of-view position to a new angle-of-view position of a three-dimensional polygon object generated in a virtual reality space and viewed in a depth direction; and generating a display image based on the detected change in view angle from said original angle-of-view by appropriately dividing a polygon plane onto which a texture is mapped, and by moving, on said polygon plane, an apex being generated as a result of division, so that the perspective of the image viewed in the depth direction after the change to said new angle-of-view position aligns with the perspective of the three-dimensional polygon object previously viewed in its original angle-of-view position, thereby reducing discordance of perspective as view angle changes.

9. An imaging apparatus for composing a display image of three-dimensional polygon object generated in a virtual reality space, projected onto a plane in a view-point coordinate system, comprising:

a texture storage device for storing the image of the three-dimensional polygon object, viewed from an original view-point, as a texture image; and a display image generating device which, based on changes in view angle from said original view-point, generates a display image by appropriately dividing a polygon plane onto which a texture image is mapped, and by moving on said polygon plane, an apex being generated as a result of division, so that the perspective of said texture image is aligned with the perspective of said generated three-dimensional polygon object in said virtual reality space.

* * * * *